(12) United States Patent
Yang

(10) Patent No.: US 9,105,930 B2
(45) Date of Patent: Aug. 11, 2015

(54) ELECTRICITY SUPPLY SYSTEM AND ELECTRICITY SUPPLY ELEMENT THEREOF

(71) Applicant: Prologium Holding Inc., Grand Cayman (KY)

(72) Inventor: Szu-Nan Yang, Taipei (TW)

(73) Assignee: PROLOGIUM HOLDING INC., Grand Cayman (KY)

( * ) Notice: Subject to any disclaimer, the term of this patent is extended or adjusted under 35 U.S.C. 154(b) by 276 days.

(21) Appl. No.: 13/712,883

(22) Filed: Dec. 12, 2012

(65) Prior Publication Data

US 2013/0101872 A1 Apr. 25, 2013

Related U.S. Application Data

(63) Continuation-in-part of application No. 13/323,825, filed on Dec. 13, 2011, now Pat. No. 8,974,945, which is a continuation-in-part of application No. 11/755,657, filed on May 30, 2007, now abandoned.

(51) Int. Cl.

| | |
|---|---|
| *H01M 4/72* | (2006.01) |
| *H01M 6/12* | (2006.01) |
| *H01M 6/46* | (2006.01) |
| *H01M 4/80* | (2006.01) |
| *H01M 4/76* | (2006.01) |
| *H01M 4/64* | (2006.01) |
| *H01M 2/02* | (2006.01) |
| *H01M 2/16* | (2006.01) |
| *H01M 2/18* | (2006.01) |
| *H01M 10/42* | (2006.01) |
| *H01M 2/26* | (2006.01) |
| *H01M 10/04* | (2006.01) |
| *H01M 2/34* | (2006.01) |

(52) U.S. Cl.
CPC ............. *H01M 4/64* (2013.01); *H01M 2/0202* (2013.01); *H01M 2/026* (2013.01); *H01M 2/166* (2013.01); *H01M 2/1613* (2013.01); *H01M 2/1653* (2013.01); *H01M 2/1673* (2013.01); *H01M 2/1686* (2013.01); *H01M 2/18* (2013.01); *H01M 2/26* (2013.01); *H01M 10/0436* (2013.01); *H01M 10/425* (2013.01); *H01M 2/34* (2013.01); *H01M 2002/0205* (2013.01)

(58) Field of Classification Search
USPC .................. 429/162, 233, 234, 236, 238, 212
IPC ............................................... H01M 4/72,4/742
See application file for complete search history.

(56) References Cited

U.S. PATENT DOCUMENTS

| | | | | |
|---|---|---|---|---|
| 2003/0099885 A1* | 5/2003 | Kim et al. | ...................... | 429/241 |
| 2003/0170533 A1* | 9/2003 | Airey et al. | .................... | 429/128 |

FOREIGN PATENT DOCUMENTS

JP 2006-100149 4/2006

* cited by examiner

*Primary Examiner* — Patrick Ryan
*Assistant Examiner* — Julian Anthony

(57) ABSTRACT

An electricity supply system and electricity supply element thereof is provided. The electricity supply system is made of a plurality of electricity supply elements by stacking or rolling. Each electricity supply element includes a substrate, two current collector layers and two active material layers. The substrate has a plurality of holes and the current collector layers, the active material layers are disposed on two sides respectively. Therefore, the ion migration is permitted by the holes and the electricity is outputted by the current collector layers. Hence, by this new structure of the electricity supply element, the resistance is decreased.

22 Claims, 12 Drawing Sheets

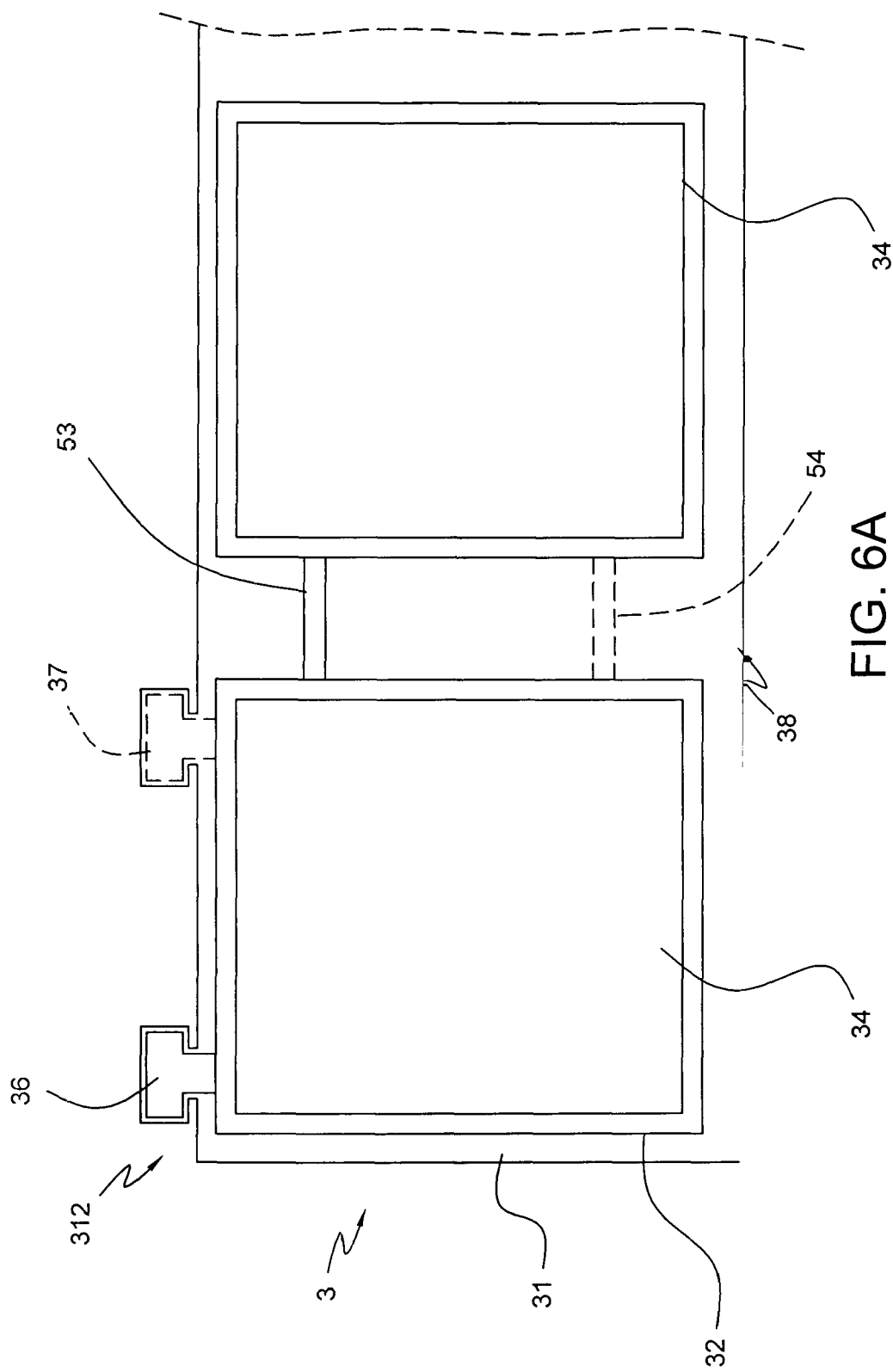

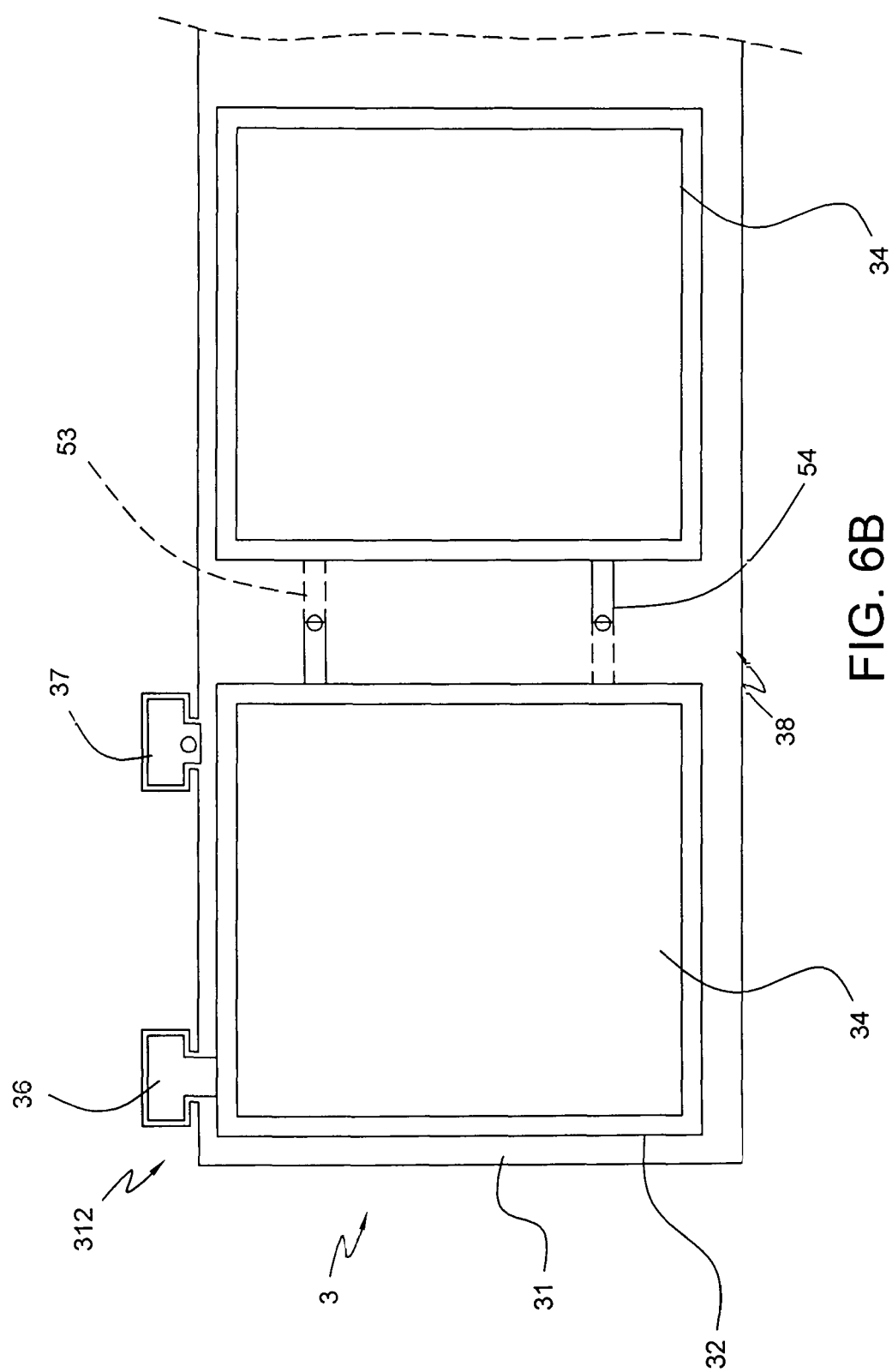

ELECTRICITY SUPPLY SYSTEM AND ELECTRICITY SUPPLY ELEMENT THEREOF

RELATED-APPLICATIONS

This application is a continuation-in-part of U.S. patent application Ser. No. 13/323,825, filed Dec. 13, 2011, which is a continuation-in-part of U.S. patent application Ser. No. 11/755,657, filed May 30, 2007. This application claims priority to all the above-referenced applications.

BACKGROUND OF THE INVENTION

1. Field of Invention

The present invention relates to an electricity supply system, in particular to a lithium battery having a simplified separator and electrode layers and a lowest amount of the interfaces inside the battery.

2. Related Art

In the electronic device industry, portability and wireless design are the major trends. Except the lighter, thinner and smaller designs, the flexibility of the electronics is highly focused as well. Hence, an electricity supply system having smaller volume, lighter weight and higher energy density is imperatively required. However, to prolong the life and to increase the energy density of the electricity supply system, the primary electricity supply system obviously cannot satisfy the demands of the current electronics. And this is the reason why the secondary electricity supply systems such as the lithium battery system, fuel cell system, solar cell system become the main stream for their recharge abilities. The lithium battery system is taken as the example for its highly development.

FIG. 1A illustrates the current cell of the lithium battery system. The main structure is constructed by a separator layer sandwiched by a cathode electrode and an anode electrode. The external electrodes of the whole lithium battery system, which are electrically connected to the peripherals, are welded individually to the tabs located in the current collectors of both cathode and anode electrodes. As shown in FIG. 1A, the lithium battery 1 includes a separator layer 11, a first active material layer 12, a second active material layer 13, a first current collector layer 14, a second current collector layer 15 and a package unit 16. The first active material layer 12 is located above the separator layer 11. The first current collector layer 14 is located above the first active material layer 12. The second active material layer 13 is located under the separator layer 11. The second current collector layer 15 is located under the second active material layer 13. The package unit 16 seals the whole stacking structure mentioned above except the two tabs 141 and 151. Accordingly, as the lithium battery 1 provides the electricity to an electronic device 2 (the circuit broad illustrated in FIG. 1A is only one embodiment and is not a limitation for the electronic device 2), the tabs 141 and 151 are electrically connected to the electricity input terminals 21 and 22 of the electronic device 2 so that the electricity stored in the lithium battery 1 is transferred to the electronic device 2. After that, the electricity is transferred to the element area 23 of the electronic device 2 by the layouts. The element area 23 mentioned here may be the circuit layouts or the surface mounted elements, that is, typically includes the logical circuit, active elements, and passive elements and so on.

However, the electrical and safety performances of the lithium battery 1 are dramatically influenced by the characteristics of both the interface between the separator layer 11 and the first active material layer 12 and the interface between the separator layer 11 and the second active material layer 13. Please refer to FIG. 1A, there have four interfaces of the lithium battery 1, i.e. the interfaces between the separator layer 11 and the first active material layer 12, between the separator layer 11 and the second active material layer 13, between the first current collector layer 14 and the first active material layer 12, and between the second current collector layer 15 and the second active material layer 13. For the current lithium battery system, the characteristics of these interfaces are controlled either by solid stacking method or by high-tension winding method (jelly roll) to ensure the good electrical and safety performances of the lithium battery system. Unfortunately, the lithium battery systems made by solid stacking or high-tension winding method are definitely lack of flexibility and even are impossible to be flexed. If the stacked battery or the winded battery is forced to be flexed it would cause the serious damage to the interfaces between the separator layer 11 and the first active material layer 12 and the separator layer 11 and the second active material layer 13.

Moreover, the active anode material may expand or shrink its volume on charge or discharge to exhibit mechanical stress to both sides of the active anode material. Please refer to FIG. 1A, for example, if the second active material layer 13 is the active anode material, the second active material layer 13 is disposed between the separator 11 and the second current collector layer 15. Therefore, the second active material layer 13 exhibits mechanical stress to the separator 11 and the second current collector layer 15 on charge or discharge. After a certain period of time, it is difficult to maintain the same quality of interfaces due to suffer of the repeating volume expansion and shrinkage.

Also, the tab 141 is usually made of aluminum. Because the aluminum can not be soldered directly, the tab 141 have to be connected with a nickel sheet by ultrasonic.

Furthermore, the tabs 141, 151 have to extend outside of the package unit 16. The thickness of the tabs 141, 151 is 100 to 150 um (micro meter), and the thickness of the package unit 16 including the glues is 60 to 120 um. Therefore, there may have a gap between the tabs 141, 151 and the package unit 16 to make the moisture resistance and the liquid barrier weaker, which may cause the outside moisture to permeate inside, or the inside electrolyte to leak out and damage the circuit.

Please refer to FIG. 1B, the stack type battery is provided with a plurality of unit cells (the lithium battery 1) stacked in a stack direction. Due to each lithium battery 1 has four interfaces as above mentioned, the total number of the interfaces would be increased accordingly. Along with the active anode material may expand or shrink on charge or discharge to exhibit mechanical stress, the reliability of the stack type battery may be influenced when one of the interfaces does not contact well. Also, the amount of the interfaces would influence the fluidity and permeability of the electrolyte. When the amount of the interfaces is increased, it costs more time to make the electrolyte permeate uniformly. Moreover, the electrolyte distribution may be not uniform even after long time that will decrease the efficiency of the battery.

Also, the leads of each battery 1 have to be connected in parallel before the tabs 141 and 151 are electrically connected to the electricity input terminals 21 and 22 of the electronic device 2. When the number of the leads is increased, the reliability and the yield rate of the welding are decreased.

SUMMARY OF THE INVENTION

It is an objective of this invention to provide an electricity supply element and its related electricity supply system. The current collector layers are disposed on the substrate. Therefore, the active material layers may be rapidly and precisely formed on the current collector layers to form the electricity supply element. The electricity supply element mentioned in this invention may be produced under higher yield rate and faster production rate.

Another objective of this invention is to provide an electricity supply element and its related electricity supply system. The current collector layers can be integrated with the substrate to form the external circuit area and the internal circuit area on the substrate. Therefore, the electricity supply element is able to be directly electrically connected to the external electrical elements or connected to each other so that the amounts of the elements exerted in the electronic may be reduced. The stack type or jelly roll type electricity supply system may be manufactured with a simplified process. Also, the aluminum or nickel tab, which is utilized in conventional battery to connect to the external electrical elements, can be eliminated. The substrate is able to become thinner, and the reliability of the package structure of the electricity supply system is increased.

It is also an objective of this invention is to provide an electricity supply element and its related electricity supply system. The package structure may be integrated with the electricity supply element so that the amounts of the total interfaces inside the electricity supply system are reduced to reduce the inner resistance of the electricity supply system and to increase the electrical performance of the electricity supply system as well.

In order to implement the abovementioned, this invention discloses an electricity supply element. The electricity supply element includes a substrate, a first current collector layer, a second current collector layer, a first active material layer and a second active material layer. The substrate includes a plurality of holes. The first and the second current collector layers are deposed on the two opposite sides of the substrate and have holes according to the holes of the substrate. The active material layers are disposed on the outer side of the current collector layers respectively. Therefore, the substrate is served as a separator to permit ion migration between the first active material layer and the second active material layer. The electric charge is outputted through the current collector layers which disposed on the substrate.

This invention discloses an electricity supply system, including a plurality electricity supply elements to stack. The same substrate may be utilized for all the electricity supply elements. Therefore, the internal circuit area, formed on the substrate, is utilized to electrically connect with each other for parallel or serial connection. Only one of the electricity supply elements has the external circuit area to connect to the external electrical elements for outputting electricity. The complicate process of the conventional electricity supply elements to connect each lead is eliminated. The electricity supply system may be produced under higher yield rate and faster production rate, and the reliability and the electrical performance of the electricity supply system is increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIGS. 5, 6A and 6B illustrate embodiments of the electricity supply system of the present invention.

DETAILED DESCRIPTION OF THE INVENTION

The invention provides an electricity supply element, which is integrated in a flexible circuit board or a rigid circuit board, and an electricity system with low cost, high electric capacity, thermal stability, and extra mechanic characteristic, such as repeat bends. Due to the electricity supply unit is integrated in a circuit substrate, the carrier or the solder pad are not necessary. Also, the circuit substrate is utilized as a separator. The thermal stability temperature of the circuit substrate is over 300. Therefore, reflow soldering method to continuously proceed SMT process, even a metal-metal eutectic process for IC, for mass-production is possible.

Figure 2:
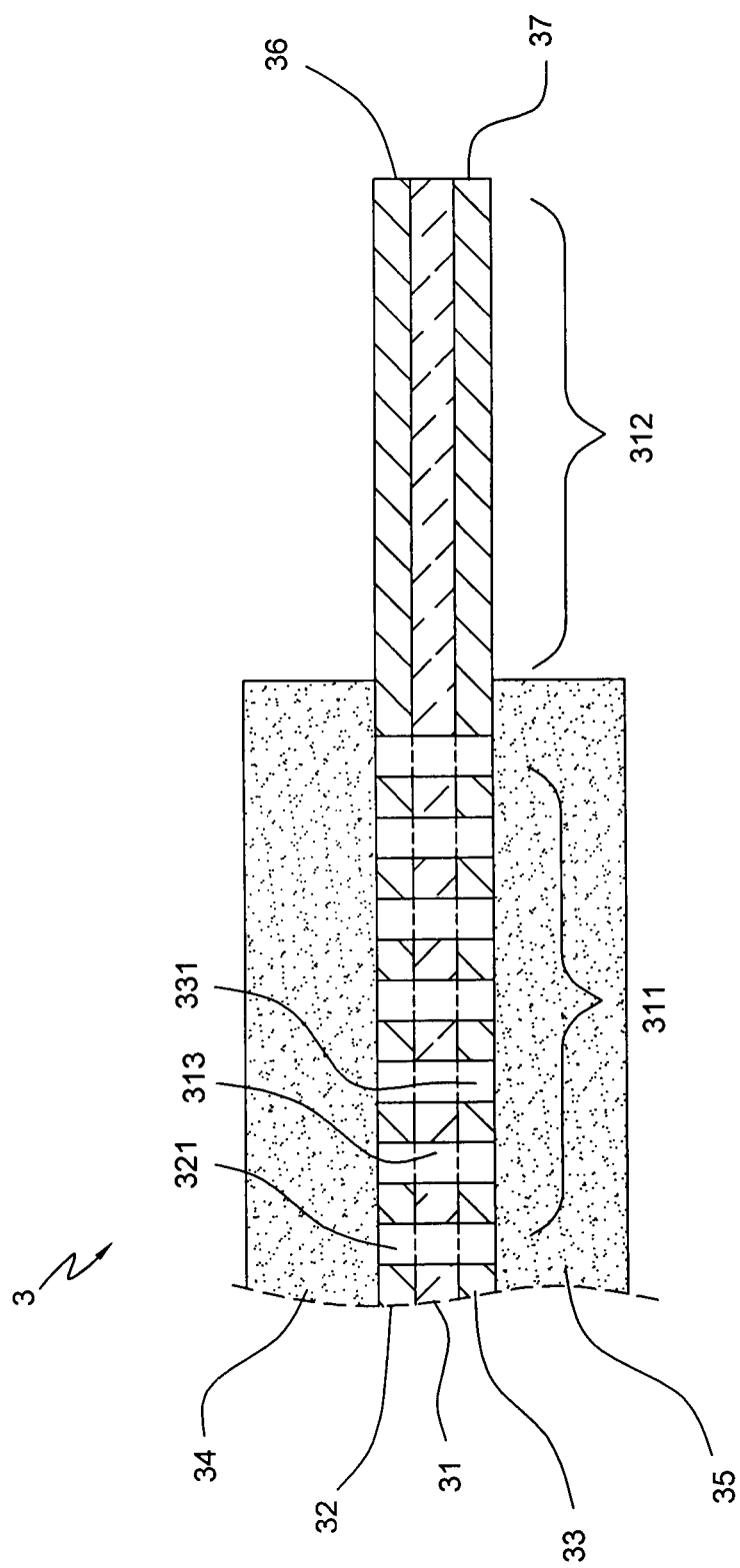
FIG. 2 illustrates the cross-sectional view of the electricity supply element of this invention.

FIG. 2 illustrates the cross-sectional view of the electricity supply element of this invention. The electricity supply element 3 of this invention includes a substrate 31, a first current collector layer 32, a second current collector layer 33, a first active material layer 34 and a second active material layer 35. The substrate 31 has a separating area 311 and an external circuit area 312 adjacent thereof. The substrate 31 has a plurality of holes 313 at the separating area 311. The first current collector layer 32 is disposed on one side of the circuit substrate 31, and has a plurality of holes 321 according to the holes 313 of the substrate 31. The second current collector layer 33 is disposed on another side of the circuit substrate 31, and has a plurality of holes 331 according to the holes 313 of the substrate 31. The first active material layer 34 and the second active material layer 35 are disposed at the outside surfaces of the first current collector layer 32 and the second current collector layer 33 respectively. And the first active material layer 34 and the second active material layer 35 are separated by the first current collector layer 32, the substrate 31 and the second current collector layer 33. The electrolyte impregnated into the first active material layer 34 and the second active material layer 35. The electrolyte is a liquid electrolyte, or a gelled electrolyte. Due to the first current collector layer 32, the substrate 31 and the second current collector layer 33 have the holes 313, 321 and 331, the electrolyte is easier to impregnate into therein. On the other hand, the electricity supply element 3 may include a solid electrolyte.

In this embodiment, the circuit substrate 31 is a flexible circuit board or a rigid circuit board. As refer to FIG. 2, the first current collector layer 32 and the second current collector layer 33 have a first terminal 36 and a second terminal 37 respectively at the external circuit area 312. The substrate 31 may be a multilayer circuit board. The material of the first terminal 36 and the second terminal 37 is copper (Cu), Aluminum (Al), nickel (Ni) or an alloy comprised of at least one of the foregoing metals. However, to simplify the manufacture process, the material of the first terminal 36 and the second terminal 37 is the same with the material of the first current collector layer 32 and the second current collector layer 33, such as copper (Cu), Aluminum (Al), or nickel (Ni), tin (Sn), silver (Ag), gold (Au), or an alloy comprised of at least one of the foregoing metals. Also, the material of the first terminal 36 and the second terminal 37 may be different with the material of the first current collector layer 32 and the second current collector layer 33. And the first terminal 36 and the second terminal 37 are connected to the first current collector layer 32 and the second current collector layer 33 respectively by wiring, electrical lead, or connecting directly. The material of the substrate 31 is insulating materials, includes polyimide (PI), polyethylene terephthalate (PET), polyethylene naphthalate (PEN), glass fiber, and liquid crystal polymer, or the combination thereof.

The substrate 31 is served as the separator to maintain separation between the first active material layer 34 and the second active material layer 35. The separating area 311 is utilized for insulation electrically and to permit ion migration between the first active material layer 34 and the second active material layer 35. The first active material layer 34 and the second active material layer 35 are used to perform electrochemistry reaction to convert Electrical energy into Chemical energy or Chemical energy into Electrical energy. The first current collector layer 32 and the second current collector layer 33 are utilized to output electric charge, produced by the first active material layer 34 and the second active material layer 35, to the first terminal 36 and the second terminal 37. The substrate 31 has the holes 313 to permit ion migration. The holes 313 are formed by through holes, ant holes, or porous material, and filled with ceramic insulation materials. The ceramic insulation materials include particulates of $TiO_2$, $Al_2O_3$, $SiO_2$ with nanometer and micrometer scale, or alkylation. The holes 313 may be further filled with a polymer adhesive, which is selected from the group consisting of Polyvinylidene fluoride (PVDF), polyvinylidene fluoride co-hexafluoropropylene (PVDF-HFP), Polytetrafluoroethene (PTFE), acrylic acid glue, epoxy resin, polyethylene oxide (PEO), polyethylene naphthalate (PEN), and polyimide (PI).

Please see the structure of the electricity supply element 3 of this invention, the first current collector layer 32 and the second current collector layer 33 are disposed on the substrate. Therefore, it only has two interfaces for this structure, i.e. the interface between the first current collector layer 32 and the first active material layer 34, and between the second current collector layer 33 and the second active material layer 35. The interface management of this structure is easier to control than the interface management of the conventional structure which has four interfaces, see FIG. 1A. Also, for example, if the second active material layer 35 is the active cathode material, the second active material layer 35 has a free side due to the second current collector layer 33 and the substrate 31 are disposed on the same side. When the active anode material, the second active material layer 35, may expand or shrink on charge or discharge, the stress exhibited is released easily. Therefore, the reliability, the stability and the safety performances of the electricity supply element 3 are improved.

The substrate 31 has the separating area 311 and the external circuit area 312 adjacent thereof to be with the following main functions.

The separating area 311 is utilized for insulation electrically and to permit ion migration between the first active material layer 34 and the second active material layer 35. The first active material layer 34 and the second active material layer 35 are used to perform electrochemistry reaction to convert Electrical energy into Chemical energy or Chemical energy into Electrical energy. The first current collector layer 32 and the second current collector layer 33 are utilized to output electric charge, produced by the first active material layer 34 and the second active material layer 35, to the first terminal 36 and the second terminal 37, pleases see FIG. 3A.

Figure 3A:
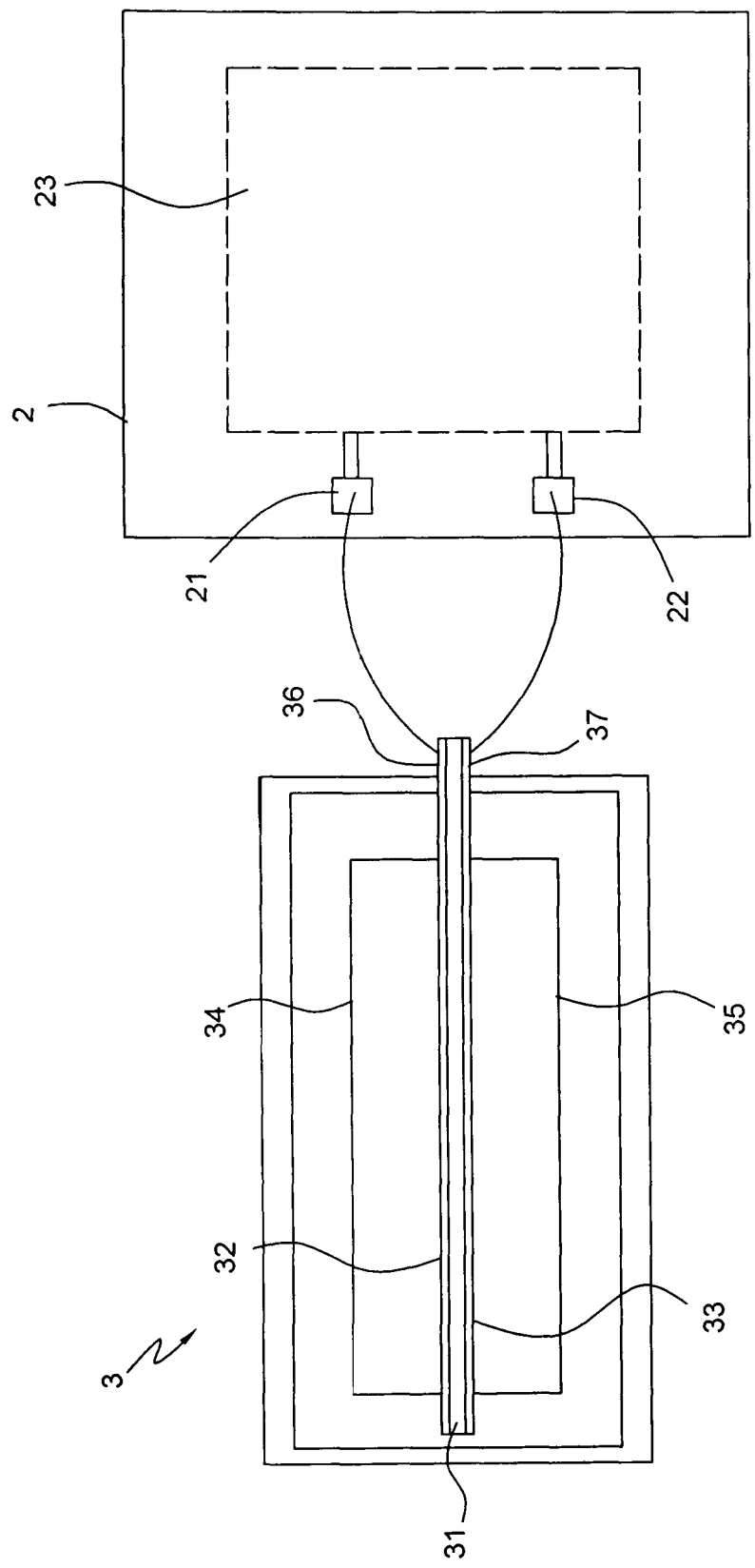
FIGS. 3A and 3B illustrate embodiments of the external circuit layout of the electricity supply element according to the present invention.
Figure 3B:
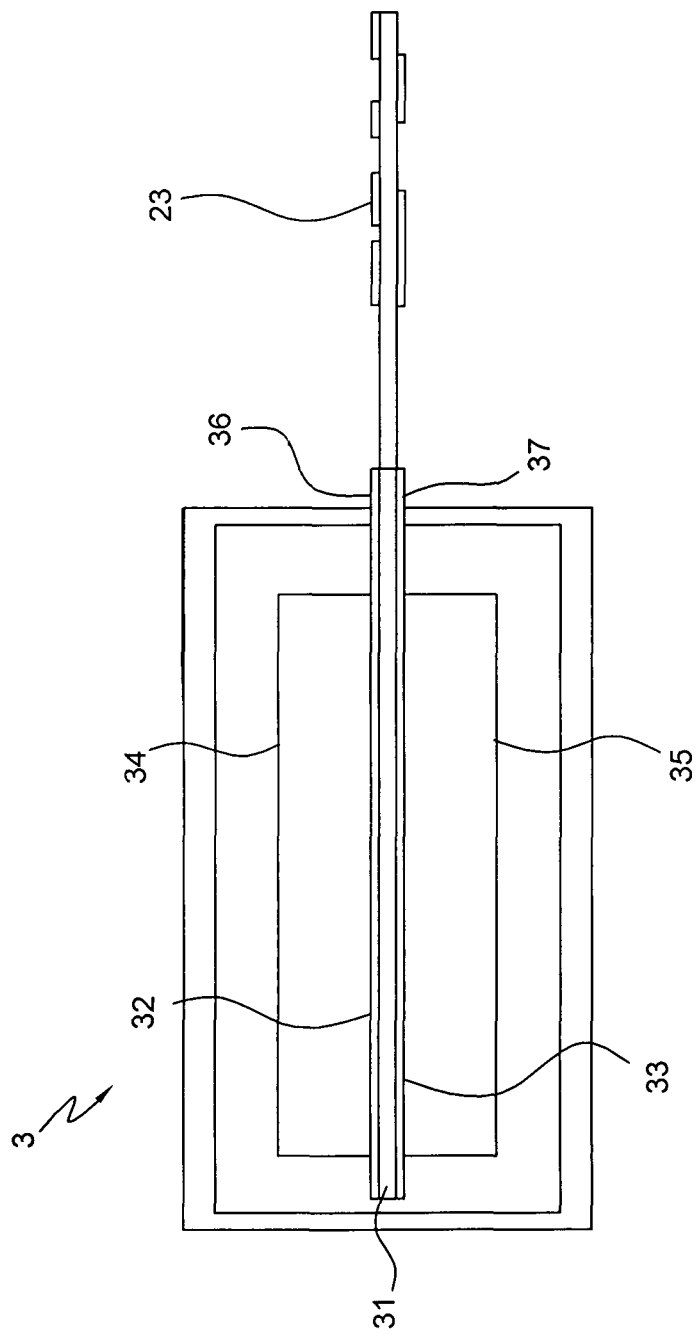

The external circuit area 312 is utilized to output electricity directly by etched traces connecting to the outside circuit directly without extra pads, see FIG. 3B. Also, the tabs of the conventional structure are eliminated.

Due to the separating are 311 could be served as a carrier or matrix for other inside electric elements, the outside circuit and electric elements are integrated in the circuit substrate 31 by the external circuit area 312. Besides, the substrate 31 with high thermal stability. Therefore, reflow soldering method to continuously proceed SMT process, even a metal-metal eutectic process for IC, for mass-production is possible.

Figure 4:
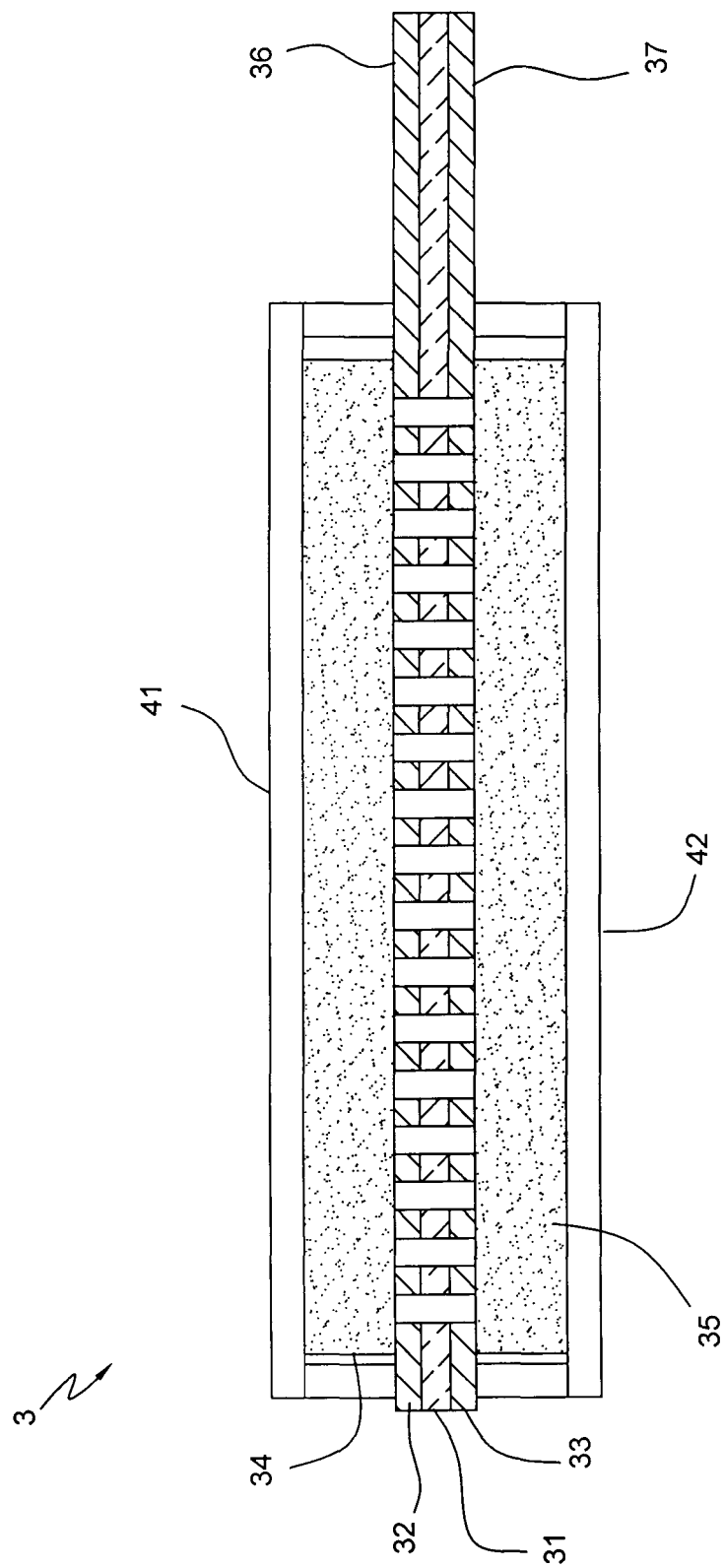
FIG. 4 illustrates the cross-section configuration view of the electricity supply element with package structure of this invention.

Please refer to FIG. 4, the first package unit 41 is located outside and around the first active material layer 34. The second package unit 42 is located outside and around the second active material layer 35. The material of the first package unit 41 and the second package unit 42 is polymer, metal, fiberglass, and combinations thereof.

To enhance the flexibility of the electricity supply element 3, the first package unit 41 and the second package unit 42 may be made of PI, PET, PS, PP, PEN, PVC, acrylic acid or epoxy. Furthermore, the material of the first package unit 41 and the second package unit 42 may be non-metal with low polarity to enhance the acid or alkali resistance to prevent erosion.

Figure 1A:
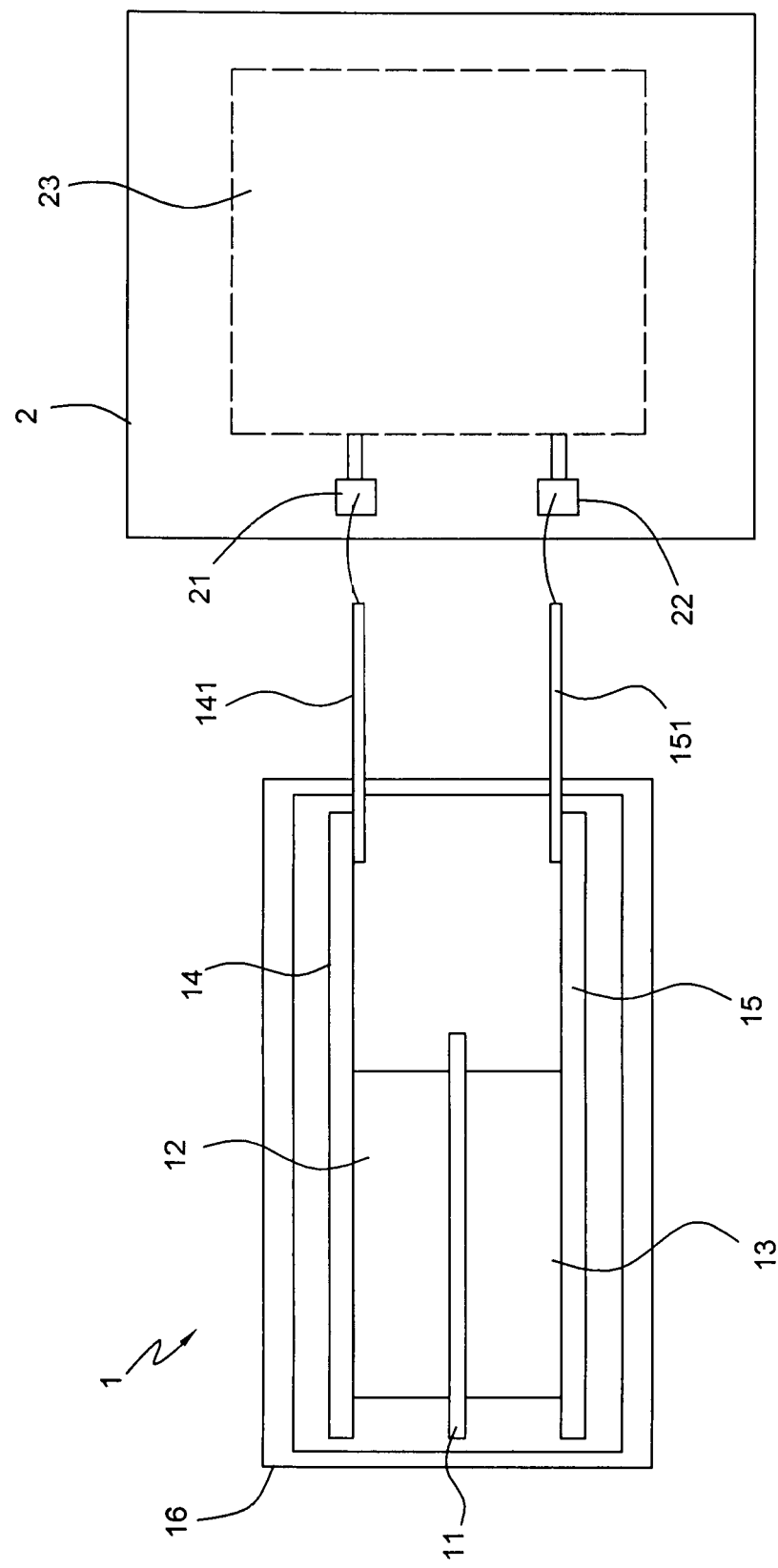
FIG. 1A illustrates the example of the cell of the prior-art lithium battery system.

Also, the electricity supply element 3 may have package structure as the conventional package structure, refer to FIG. 1A and FIG. 3A. Due to electricity supply element 3 is connected to the electronic device 2 by the first terminal 36 and the second terminal 37, which is extended from the substrate 31. Therefore, the structure is thinner than the conventional structure with the tabs 141, 151 and easier to package without defects. Furthermore, the substrate 31 may be shaped by pressing to reduce the width of the package area, see FIG. 6A. The package performance could be improved.

Figure 5:
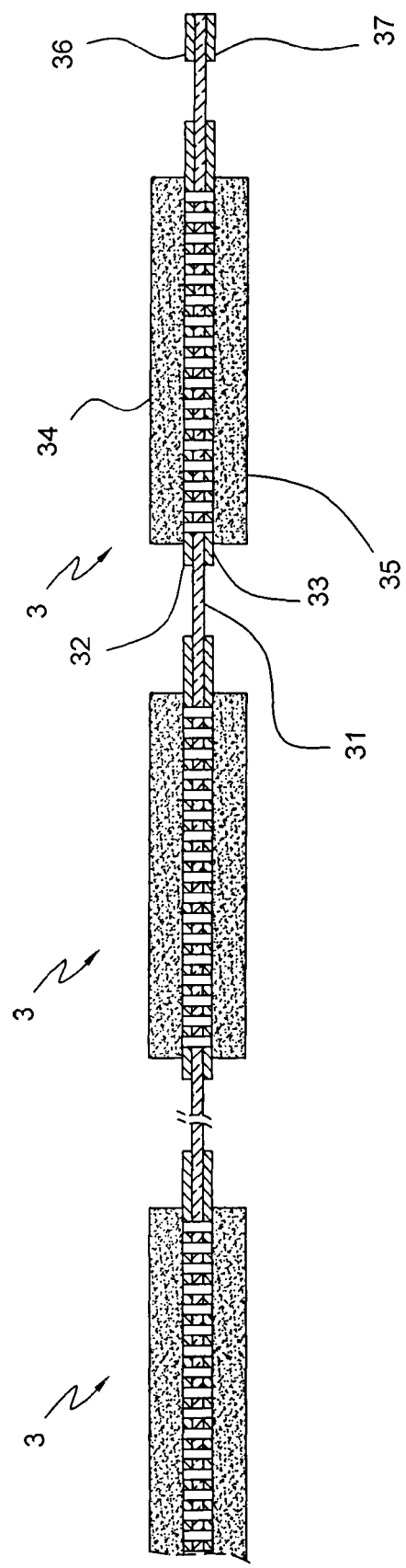

When forming the electricity supply system of this invention, please refer to FIGS. 5 and 6A, a plurality of the electricity supply elements 3 are formed on the substrate 31. Each electricity supply element 3 includes an internal circuit area 38. The internal circuit area 38 includes a first lead 53 and a second lead 54 thereon. The first lead 53 and the second lead 54 are electrically connected with the first current collector layer 32 and the second current collector layer 33 of the adjacent electricity supply elements 3 for parallel or serial connection. Please see FIG. 6A, the current collector layers 32, 33 with the same polarity of the adjacent electricity supply elements 3 is connected by the leads 53, 54 for parallel connection. Please see FIG. 6B, the current collector layers 32, 33 with the different polarity of the adjacent electricity supply elements 3 is connected by the leads 53, 54 for serial connection. Also, the current collector layers 32, 33 may have different polarity on the same side. As the FIG. 5 shown, the electricity supply elements 3 have the same substrate 31. The electricity supply elements 3 may have individual substrates 31.

Figure 7A:
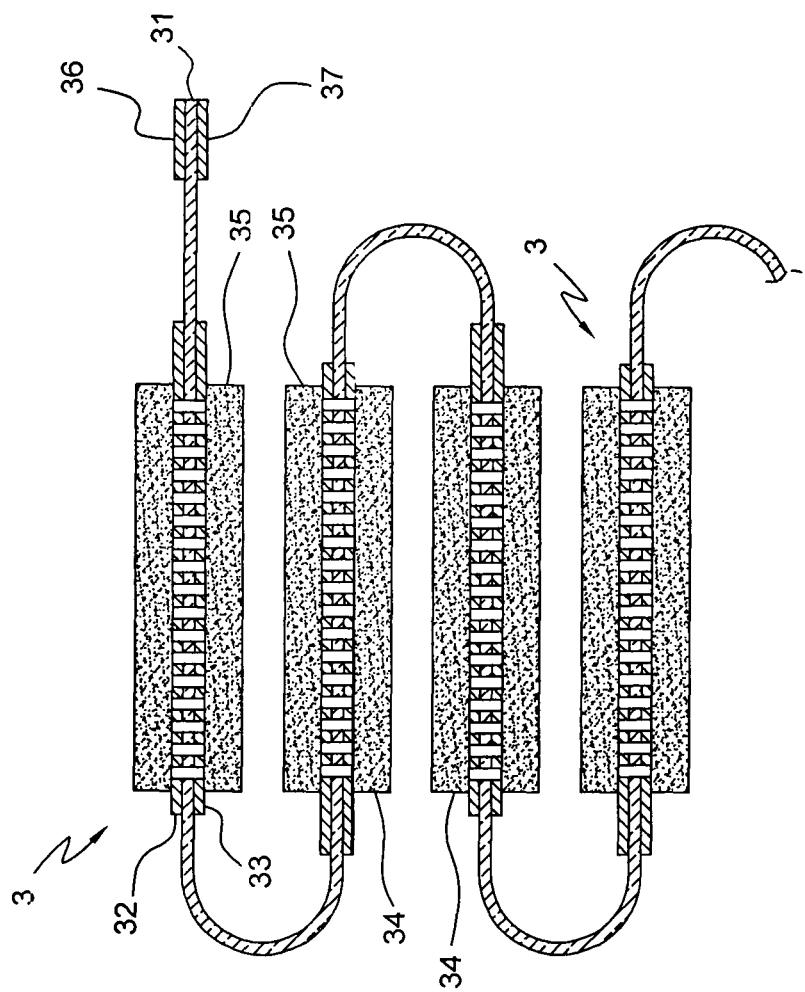
FIG. 7A illustrates the cross-sectional view of the electricity supply system of this invention.
Figure 7B:
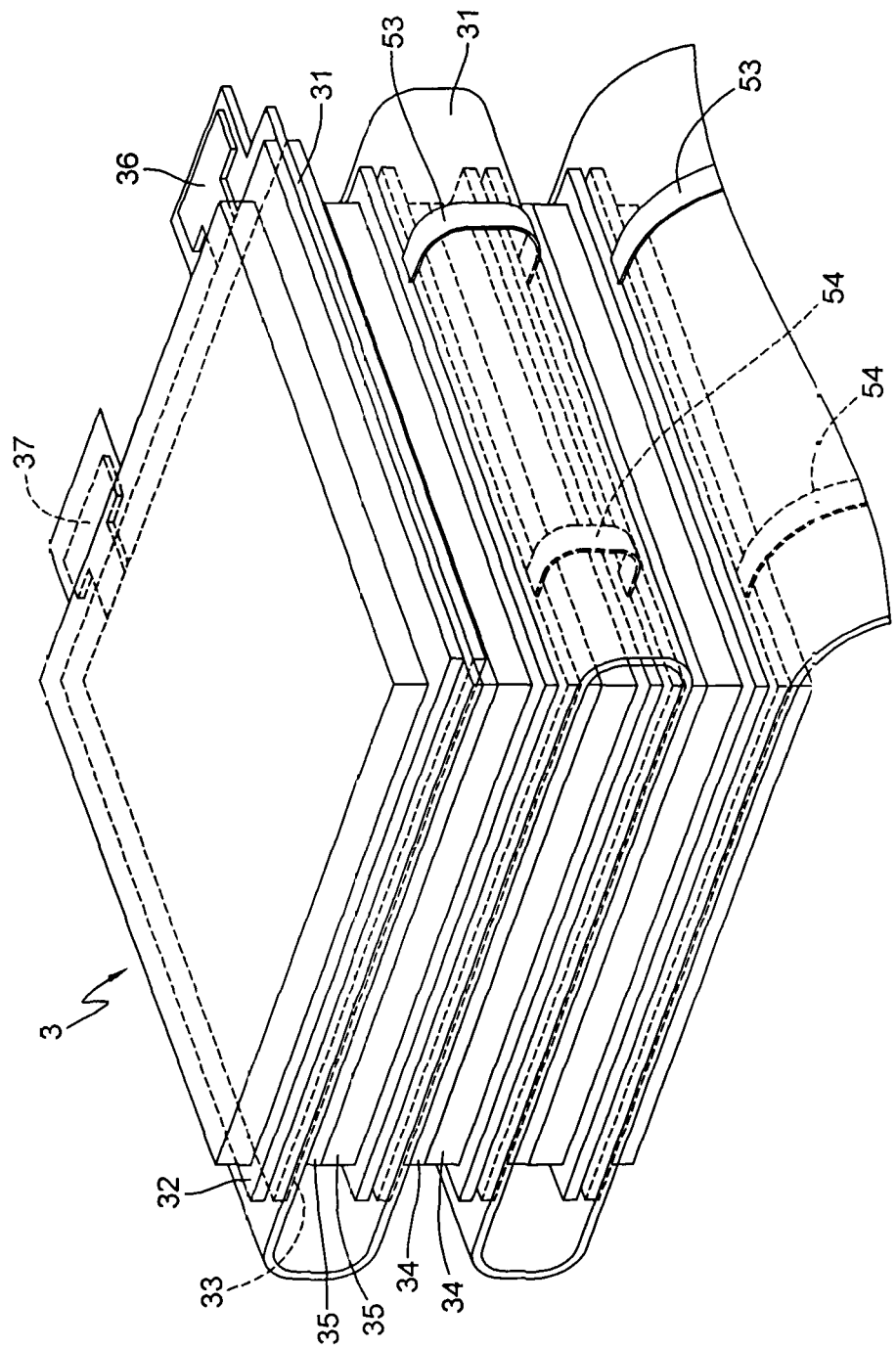
FIG. 7B illustrates the respective view of the electricity supply element of this invention.

The substrate 31 is the flexible circuit board and can be bent to a Z-type stack, please refer to FIGS. 7A and 7B. The active material layers 34, 35 with the same polarity are faced to each other. On the other hand, the first active material layers 34 faces to the first active material layers 34. The second active material layers 35 faces to the second active material layers 35. Due to the first current collector layer 32, the substrate 31 and the second current collector layer 33 have the holes 313, 321 and 331, the electrolyte is easier to impregnate into the whole electricity supply system. Also, only two interfaces are presented, i.e. the interface between the first current collector layer 32 and the first active material layer 34, and between the second current collector layer 33 and the second active material layer 35, for each electricity supply elements 3. And the active material layers 34, 35 with the same polarity are faced to each other for the adjacent electricity supply elements 3. Therefore, the interface management of the electricity supply system is very easy. When the active anode material, the second active material layer 35, may expand or shrink on charge or discharge, the second active material layer 35 will only touch or push the adjacent second active material layer 35. The stress exhibited is released easily, and the structure would be maintained. Therefore, the reliability, the stability and the safety performances of the electricity supply system are improved.

Figure 1B:
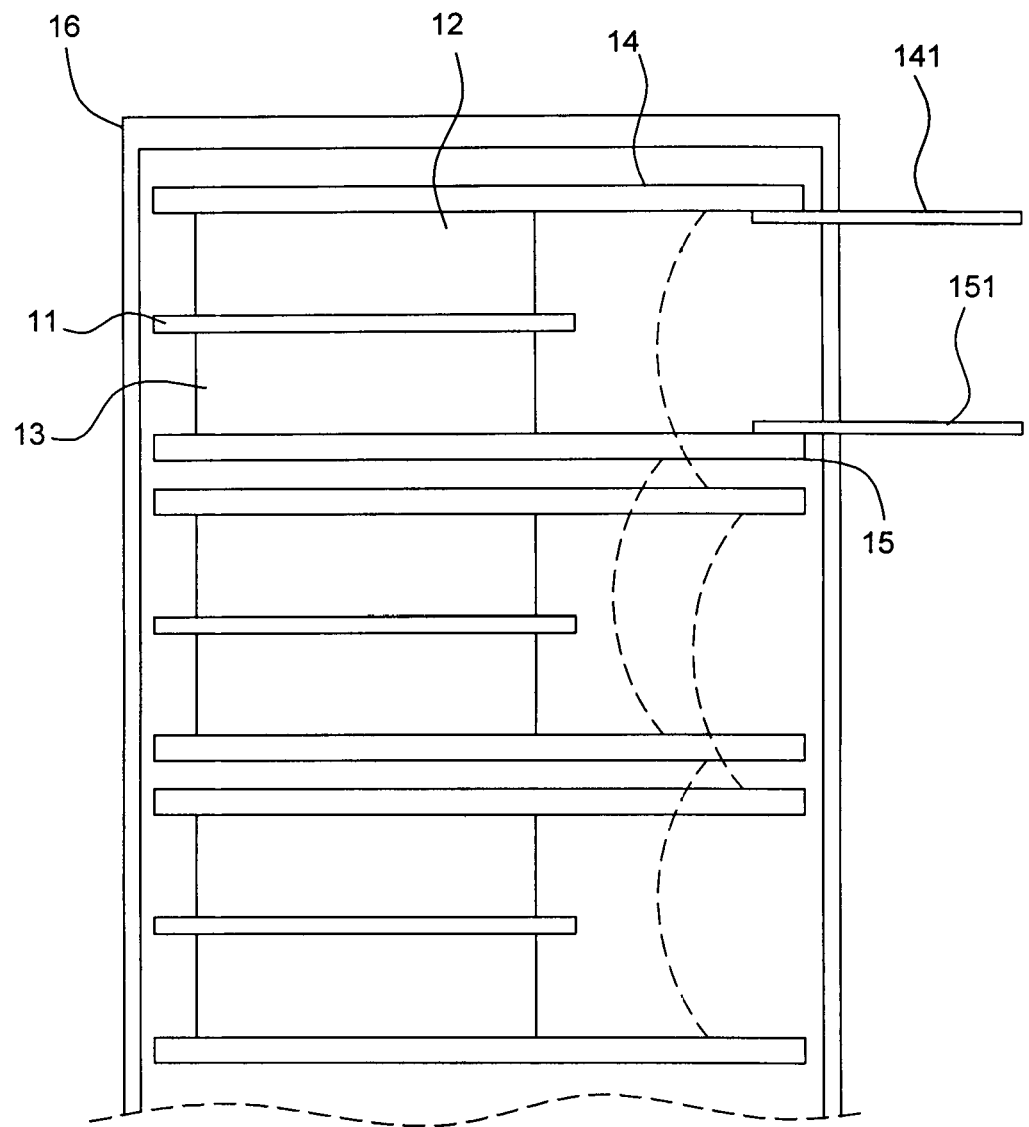
FIG. 1B illustrates the example of the conventional stack type lithium battery system.
Figure 8:
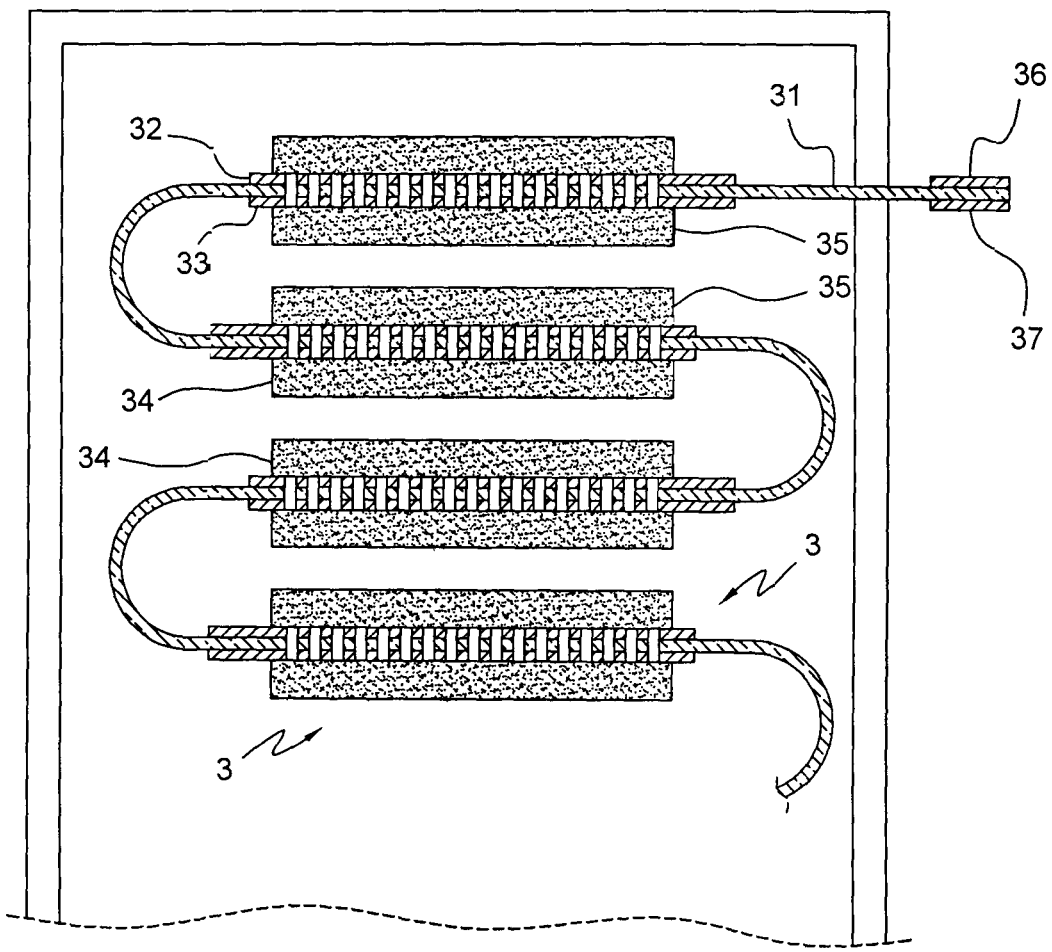
FIG. 8 illustrates an embodiment of the electricity supply system with package structure of the present invention.

Only one of the electricity supply elements 3 has the external circuit area 312, also see FIG. 6A, to connect to the external electrical elements for outputting electricity through the terminals 36, 37 by anisotropic conductive adhesive (ACA). The complicate process of the conventional electricity supply elements to connect each lead is eliminated, as shown in FIG. 1B. The electricity supply system may be produced under higher yield rate and faster production rate, and the reliability and the electrical performance of the electricity supply system is increased. The first terminal 36 and the second terminal 37 may be formed on the same side of the first current collector layer 32 and the second current collector layer 33, as shown in FIG. 6A. On the other hand, the first terminal 36 and the second terminal 37 are located at opposite surface. Also, the first terminal 36 and the second terminal 37 may be located at the same surface by the through hole, as shown in FIG. 6B. Furthermore, only one pair of terminals 36, 37 has to be package. Please compare FIG. 8 and FIG. 1B, the package of the electricity supply system is simplified. The electricity supply system may be produced under higher yield rate. Moreover, the electricity supply system may also be a jelly roll type battery.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electricity supply element, comprising:
a substrate, including a plurality of holes;
a first current collector layer, disposed on one side of the substrate and including a plurality of holes according to the holes of the substrate;
a second current collector layer, disposed on an opposite side of the substrate and including a plurality of holes according to the holes of the substrate;
a first active material layer, disposed on the first current collector layer; and
a second active material layer, disposed on the second current collector layer;
wherein the holes of the substrate are filled with ceramic insulation materials.

2. The electricity supply element of claim 1, wherein the substrate is formed of a material including polyimide (PI), polyethylene terephthalate (PET), polyethylene naphthalate (PEN), glass fiber, and liquid crystal polymer.

3. The electricity supply element of claim 1, further comprising an electrolyte impregnated into the first active material layer and the second active material layer.

4. The electricity supply element of claim 3, wherein the electrolyte is a liquid electrolyte, or a gelled electrolyte.

5. The electricity supply element of claim 1, wherein the substrate further includes an external circuit area adjacent to an area with the holes.

6. The electricity supply element of claim 5, wherein the external circuit area includes a first terminal and a second terminal, and are electrically connected with the first and the second current collector layers, respectively.

7. The electricity supply element of claim 1, further comprises a first package unit and a second package unit, whereby the first package unit is disposed around the edge of the first active material layer and the second package unit is disposed around the edge of the second active material layer.

8. The electricity supply element of claim 7, wherein the material of the first and the second package units is polymer, metal, fiberglass, and combinations thereof.

9. The electricity supply element of claim 1, wherein the holes of the substrate are formed by through holes, ant holes, or porous material.

10. The electricity supply element of claim 1, wherein the ceramic insulation materials comprise particulates of $TiO_2$, $Al_2O_3$, $SiO_2$ with nanometer and micrometer scale, or alkylation.

11. The electricity supply element of claim 10, wherein the holes of the substrate are further filled with a polymer adhesive, which is selected from the group consisting of Polyvinylidene fluoride (PVDF), polyvinylidene fluoride co-hexafluoropropylene (PVDF-HFP), Polytetrafluoroethene (PTFE), acrylic acid glue, epoxy resin, polyethylene oxide (PEO), polyethylene naphthalate (PEN), and polyimide (PI).

12. The electricity supply element of claim 1, further comprising a solid electrolyte.

13. An electricity supply system, including a plurality electricity supply elements to stack, the electricity supply element comprising:
a substrate, including a plurality of holes;
a first current collector layer, disposed on one side of the substrate and including a plurality of holes according to the holes of the substrate;
a second current collector layer, disposed on an opposite side of the substrate and including a plurality of holes according to the holes of the substrate;
a first active material layer, disposed on the first current collector layer; and
a second active material layer, disposed on the second current collector layer;
wherein the holes of the substrate are filled with ceramic insulation materials.

14. The electricity supply system of claim 13, wherein the electricity supply elements have the same substrate.

15. The electricity supply system of claim 13, wherein each electricity supply element includes an internal circuit area to electrically connect with the first and the second current collector layers of the adjacent electricity supply elements for parallel or serial connection.

16. The electricity supply system of claim 13, wherein the substrate is formed of a material including polyimide (PI), polyethylene terephthalate (PET), polyethylene naphthalate (PEN), glass fiber, and liquid crystal polymer.

17. The electricity supply system of claim 13, wherein each electricity supply element includes an electrolyte impregnated into the first active material layer and the second active material layer.

18. The electricity supply system of claim 17, wherein the electrolyte is a liquid electrolyte, or a gelled electrolyte.

19. The electricity supply system of claim 13, wherein the substrate further includes an external circuit area adjacent to an area with the holes.

20. The electricity supply system of claim 19, wherein the external circuit area includes a first terminal and a second terminal, and are electrically connected with the first and the second current collector layers, respectively.

21. The electricity supply system of claim 13, wherein the holes of the substrate are formed by through holes, ant holes, or porous material.

22. The electricity supply system of claim 13, wherein the electricity supply element further comprises a solid electrolyte.

* * * * *